(12) United States Patent
Kitamura

(10) Patent No.: US 10,908,260 B2
(45) Date of Patent: Feb. 2, 2021

(54) MOUNTING ANGLE ERROR DETECTION METHOD AND APPARATUS FOR ONBOARD RADAR APPARATUS, AND ONBOARD RADAR APPARATUS

(71) Applicant: DENSO CORPORATION, Kariya (JP)

(72) Inventor: Takayuki Kitamura, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 503 days.

(21) Appl. No.: 15/553,513

(22) PCT Filed: Feb. 25, 2016

(86) PCT No.: PCT/JP2016/055557
§ 371 (c)(1),
(2) Date: Aug. 24, 2017

(87) PCT Pub. No.: WO2016/136857
PCT Pub. Date: Sep. 1, 2016

(65) Prior Publication Data
US 2018/0120416 A1 May 3, 2018

(30) Foreign Application Priority Data
Feb. 25, 2015 (JP) .................................. 2015-035291

(51) Int. Cl.
G01S 7/40 (2006.01)
G01S 13/931 (2020.01)
G01S 7/41 (2006.01)

(52) U.S. Cl.
CPC ............ G01S 7/4026 (2013.01); G01S 7/415 (2013.01); G01S 13/931 (2013.01);
(Continued)

(58) Field of Classification Search
CPC .............................. G01S 7/4026; G01S 13/931
(Continued)

(56) References Cited

U.S. PATENT DOCUMENTS 5,977,906 A * 11/1999 Ameen ................. G01S 13/931
342/174
7,768,445 B2 * 8/2010 Inaba ....................... H01Q 3/26
342/112
(Continued)

FOREIGN PATENT DOCUMENTS

JP 2002-228749 8/2002
JP 2007-003395 A 1/2007
(Continued)

*Primary Examiner* — Bernarr E Gregory
*Assistant Examiner* — Nuzhat Pervin
(74) *Attorney, Agent, or Firm* — Maschoff Brennan

(57) ABSTRACT

In a mounting angle error detection method, a relative speed to an object that has reflected continuous waves is determined. An estimated orientation of the object is determined for each frequency bin. An approximated straight line that indicates a relationship between a relative speed of a stationary object relative to the own vehicle and an orientation at which the stationary object is positioned is calculated from the relative speed and estimated orientation determined. As a mounting angle error of the onboard radar apparatus, a difference between an orientation angle identified from the approximated straight line and at which the relative speed of the stationary object relative to the own vehicle is zero, and an orientation angle at which the relative speed of the stationary object relative to the own vehicle is zero when the onboard radar apparatus is mounted in the own vehicle at a predetermined mounting angle is determined.

15 Claims, 5 Drawing Sheets

(52) U.S. Cl.
CPC . *G01S 2007/403* (2013.01); *G01S 2007/4091* (2013.01); *G01S 2013/93272* (2020.01); *G01S 2013/93274* (2020.01)

(58) Field of Classification Search
USPC .......................................................... 342/174
See application file for complete search history.

(56) References Cited

U.S. PATENT DOCUMENTS

| | | | | |
|---|---|---|---|---|
| 9,610,961 | B2* | 4/2017 | Breuing | B61L 99/00 |
| 9,958,541 | B2* | 5/2018 | Kishigami | G01S 13/931 |
| 2007/0198188 | A1* | 8/2007 | Leineweber | B60W 30/143 |
| | | | | 701/300 |
| 2008/0012752 | A1* | 1/2008 | Okamura | G01S 7/4026 |
| | | | | 342/165 |
| 2010/0295722 | A1* | 11/2010 | Shingyoji | G01S 7/4056 |
| | | | | 342/70 |
| 2011/0040468 | A1* | 2/2011 | Leineweber | G08G 1/163 |
| | | | | 701/96 |
| 2011/0208496 | A1* | 8/2011 | Bando | G01S 19/49 |
| | | | | 703/2 |
| 2015/0070207 | A1* | 3/2015 | Millar | G01S 13/4454 |
| | | | | 342/174 |
| 2015/0247924 | A1* | 9/2015 | Kishigami | G01S 13/931 |
| | | | | 342/70 |
| 2016/0011299 | A1* | 1/2016 | Satou | G01S 13/34 |
| | | | | 342/70 |

FOREIGN PATENT DOCUMENTS

| | | | | | |
|---|---|---|---|---|---|
| JP | 2007003395 A | * | 1/2007 | .......... | G01S 7/4026 |
| JP | 2012-078187 A | | 4/2012 | | |
| JP | 2012078187 A | * | 4/2012 | | |
| JP | 2014-153256 A | | 8/2014 | | |
| JP | 2014153256 A | * | 8/2014 | .......... | G01S 13/584 |
| WO | WO 2007/015288 | | 2/2007 | | |

* cited by examiner

MOUNTING ANGLE ERROR DETECTION METHOD AND APPARATUS FOR ONBOARD RADAR APPARATUS, AND ONBOARD RADAR APPARATUS

CROSS-REFERENCE TO RELATED APPLICATIONS

The present application is based on and claims the benefit of priority from Japanese Patent Application No. 2015-035291, filed on Feb. 25, 2015, the descriptions of which are incorporated herein by reference.

TECHNICAL FIELD

The present disclosure relates to a technology for detecting an orientation of an object using electromagnetic waves. In particular, the present disclosure relates to a method and an apparatus for detecting error in a mounting angle of an onboard radar apparatus, and the onboard radar apparatus.

BACKGROUND ART

In an onboard radar apparatus that is set in a vehicle, the setting state of the onboard radar apparatus may change due to a cause of some sort (such as changes over the years). A mounting angle relative to the vehicle may shift from a predetermined mounting angle. In this case, the onboard radar apparatus may erroneously detect a position of an object. As a method for detecting such a shift in the mounting angle of the onboard radar apparatus relative to the vehicle, for example, a following method is known (refer to PTL 1). In a method described in PTL 1, among pieces of observation data detected by the onboard radar apparatus, observation data in which a relative speed is zero is extracted as a wall candidate. The extracted pieces of data are collected. A direction at which the relative speed is zero is determined from the collected data. The direction is a direction that is at 90° relative to a longitudinal direction of the vehicle. In the method described in PTL 1, the mounting angle of the onboard radar apparatus is estimated based on the foregoing.

CITATION LIST

Patent Literature

[PTL 1] JP-A-2014-153256

SUMMARY OF INVENTION

Technical Problem

However, as a result of examination by the inventors, an issue has been found in that, in the conventional technology, an accurate estimation result cannot be obtained until observation points at which the relative speed is zero are collected to a certain extent. Time is required until an estimation result having the necessary accuracy is obtained.

An object of the present disclosure is to provide a technology for detecting an error in a mounting angle of an onboard radar apparatus in a short amount of time and, further, a technology for improving detection performance regarding an orientation at which an object is present using the detection result.

A mounting angle error detection method according to an aspect of the present disclosure detects an error in a mounting angle of an onboard radar apparatus relative to an own vehicle, in the onboard radar apparatus that is set in the own vehicle such that a direction that is at 90° relative to a longitudinal direction of the own vehicle is included in a scanning range and detects at least an orientation at which an object is present using continuous waves, and includes the following first step to fourth step.

At a first step, a relative speed to an object that has reflected the continuous waves is determined by a frequency analysis being performed on a signal obtained by the continuous waves being transmitted and received. At a second step, an estimated orientation that is an estimated value of an orientation at which the object is positioned is determined for each frequency bin in which presence of the object is confirmed by the frequency analysis at the first step. At a third step, an approximated straight line that indicates a relationship between a relative speed of a stationary object relative to the own vehicle and an orientation at which the stationary object is positioned is calculated from the relative speed and the estimated orientation determined at the first step and the second step. At a fourth step, as a mounting angle error of the onboard radar apparatus relative to the own vehicle, a difference between an orientation angle that is identified from the approximated straight line calculated at the third step and at which the relative speed of the stationary object relative to the own vehicle is zero, and an orientation angle at which the relative speed of the stationary object relative to the own vehicle is zero when the onboard radar apparatus is mounted in the own vehicle at a predetermined mounting angle is determined.

In addition, a mounting angle error detection apparatus according to an aspect of the present invention includes a relative speed calculating unit that performs the above-described process at the first step, an orientation estimating unit that performs the above-described process at the second step, an approximated straight line calculating unit that performs the above-described process at the third step, and an angle error calculating unit that performs the above-described process at the fourth step.

That is, according to an aspect of the present disclosure, focus is placed on the fact that a graph indicating a relationship between the relative speed of a stationary object relative to the own vehicle and the orientation at which the stationary object is positioned can be approximated by a straight line when the relative speed is near 0. An orientation angle identified on the approximated straight line obtained from measurement results and at which the relative speed of the stationary object to the own vehicle is 0, and an orientation angle that is obtained from a theoretical value and at which the relative speed of the stationary object to the own vehicle is 0 are compared. As a result, the mounting angle error of the onboard radar apparatus is determined.

As a result of a configuration such as this, observation data in which the relative speed of the stationary object relative to the own vehicle is other than 0 can also be used in the calculation of the mounting angle error of the onboard radar apparatus. Therefore, time required until observation data of an amount necessary for calculation is acquired can be shortened. That is, a mounting angle error having the necessary accuracy can be acquired in a short amount of time.

Furthermore, an onboard radar apparatus according to an aspect of the present disclosure includes the above-described mounting angle error detection apparatus, a correction value calculating unit, and an orientation correcting unit. The correction value calculating unit determines an orientation correction value by performing a statistical process on the mounting angle error determined by the angle error calculating unit. The orientation correcting unit corrects the orientation estimated by the orientation estimating unit using the orientation correction value.

As a result of a configuration such as this, detection error regarding orientation based on shifting of the mounting angle is suppressed. Consequently, detection accuracy regarding orientation can be improved.

Reference numbers within the parentheses in the scope of claims indicate corresponding relationships with specific means according to an embodiment described hereafter as an aspect, and do not limit the technical scope of the present invention.

DESCRIPTION OF EMBODIMENTS

An embodiment to which the present disclosure is applied will hereinafter be described with reference to the drawings.
[Configuration]

Figure 1:
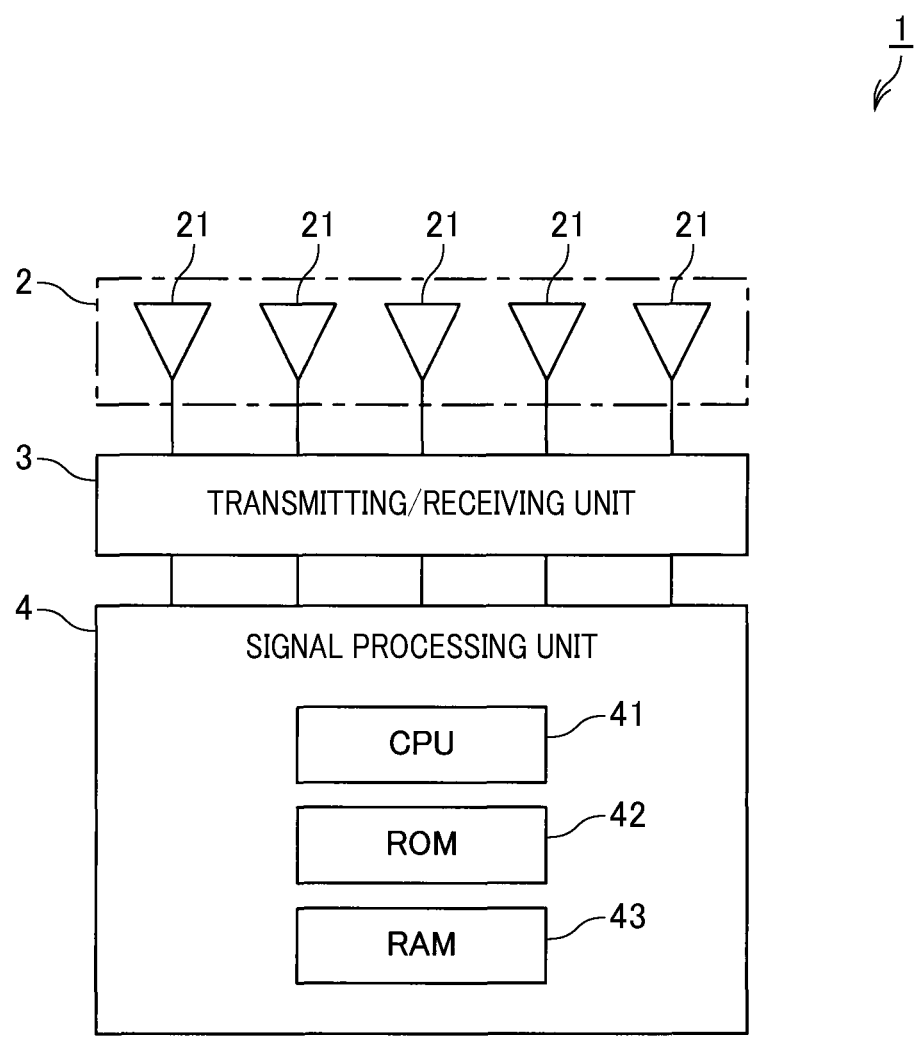
FIG. 1 is a block diagram of a configuration of an onboard radar apparatus including a mounting angle error detection apparatus according to an embodiment of the present disclosure.

An onboard radar apparatus 1 shown in FIG. 1 is mounted in a vehicle. The onboard radar apparatus 1 includes an antenna unit 2, a transmitting/receiving unit 3, and a signal processing unit 4. In the vehicle, the onboard radar apparatus 1 is used such as to be set inside a bumper that is composed of a material that allows electromagnetic waves to pass. Here, the onboard radar apparatus 1 is set in a bumper that is installed on a rear side of the vehicle, near a right end of the bumper in an advancing direction. In addition, the onboard radar apparatus 1 is set in a direction in which a side of the vehicle (a direction at 90° relative to a longitudinal direction of the vehicle) is included in a scanning range (see FIG. 4). Furthermore, the onboard radar apparatus 1 is communicably connected to another onboard apparatus (not shown) that is mounted in the vehicle, via an onboard local area network (LAN) (not shown) that is mounted in the vehicle.

The antenna unit 2 includes a plurality of antennas 21 that are arranged in a single row in a horizontal direction. The antenna unit 2 transmits and receives electromagnetic waves as radar waves.

The transmitting/receiving unit 3 periodically transmits and receives radar waves at a fixed time interval, via the antenna unit 2. The radar waves are composed of a multiple frequency continuous wave (CW). In addition, the transmitting/receiving unit 2 generates a beat signal for each reception signal received by each antenna 21 configuring the antenna unit 2. The beat signal is composed of a frequency component of a difference between the reception signal and a transmission signal. The transmitting/receiving unit 2 then supplies the signal processing unit 4 with reception data that is the beat signal to which analog-to-digital (A/D) conversion has been performed. The multiple frequency CW is composed of a plurality of continuous waves of GHz order of which frequencies differ from each other by about 1 MHz.

The signal processing unit 4 is composed of a known microcomputer that is mainly configured by a central processing unit (CPU) 41, a read-only memory (ROM) 42, and a random access memory (RAM) 43. The signal processing unit 4 at least performs a main process in which an object that has reflected the radar waves is detected and information related to the object is generated, based on a program stored in the ROM. A portion of the RAM 43 is configured by a non-volatile memory that holds the content in the memory even should power of the onboard radar apparatus 1 be turned off. The non-volatile memory stores therein a mounting angle error $\Delta\theta$ of the onboard radar apparatus that is determined at each measurement cycle, and an orientation correction value determined based on the mounting angle error $\Delta\theta$.
[Processes]

Figure 2:
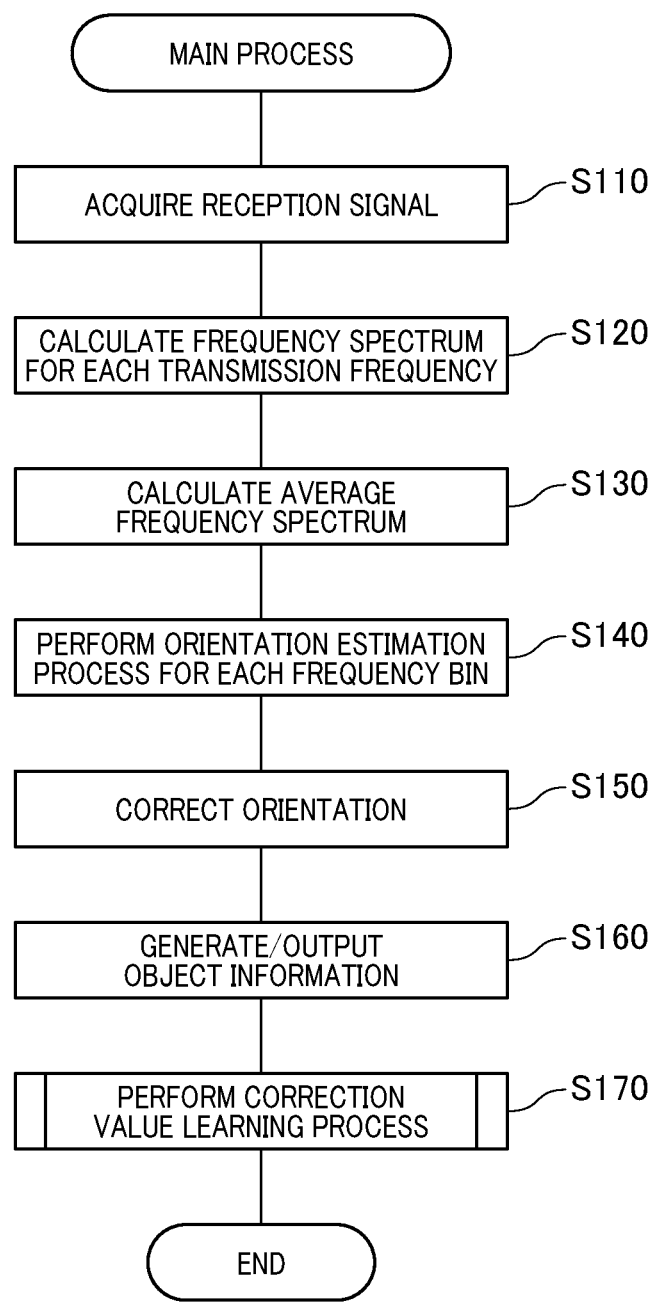
FIG. 2 is a flowchart of a main process performed by a signal processing unit of the onboard radar apparatus.

Next, the main process performed by the CPU 41 of the signal processing unit 4 will be described with reference to a flowchart in FIG. 2. The present process is started at every measurement cycle in which the radar waves are transmitted and received.

When the present process is started, at step S110, the CPU 41 acquires sampling data of the beat signals amounting to a single measurement cycle that are obtained as a result of the transmitting/receiving unit 3 transmitting and receiving the radar waves. In the single measurement cycle, sampling data related to all transmission frequencies of the multiple frequency CW is included.

At step S120, the CPU 41 performs frequency analysis on the sampling data, and thereby calculates a frequency spectrum for each transmission frequency of the multiple frequency CW and for each antenna 21 configuring the antenna unit 2. Here, fast-Fourier transform (FFT) is used as the frequency analysis. Frequency bins in the frequency spectrum obtained as a result indicate a relative speed to the object that has reflected the radar waves.

At step S130, the CPU 41 calculates an average frequency spectrum for each antenna 21, based on the frequency spectrums determined at step S120.

At step S140, the CPU 41 extracts, from the average frequency spectrum, frequency bins in which peak values at which reception strength becomes equal to or greater than a predetermined threshold are detected. The CPU 41 performs an orientation estimation process for each frequency bin. As the orientation estimation process, a high-resolution estimation process such as multiple signal classification (MUSIC) or the Capon method is preferred. However, digital beamforming (DBF) or the like may also be used.

At step S150, the CPU 41 adds an orientation correction value to the orientation (referred to, hereafter, as an "estimated orientation") estimated at step S140, and thereby corrects the estimated orientation. The orientation correction value is calculated at step S270 (described hereafter) in a previous measurement cycle and stored in the RAM 43

At step S160, the CPU 41 generates object information for each object that has generated a peak in the average frequency spectrum. The object information includes at least a relative speed between the object and the own vehicle, and an orientation at which the object is present. The CPU 41 provides the object information to each onboard apparatus that uses the object information, via the onboard LAN.

At step S170, the CPU 41 performs a correction value learning process for learning the orientation correction value using the processing results at earlier steps S30 and S140. The CPU 41 then ends the present process.

Figure 3:
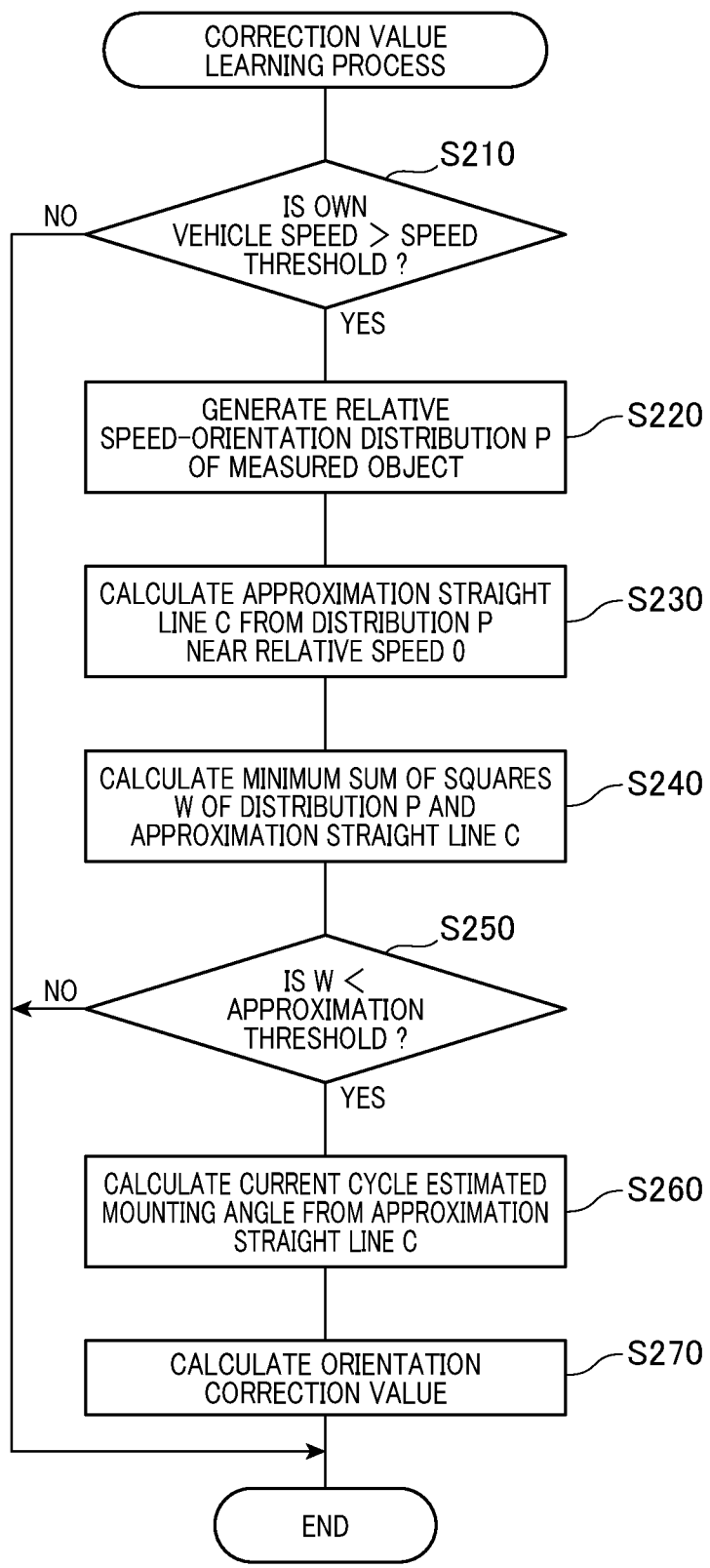
FIG. 3 is a flowchart of a correction value learning process performed by the signal processing unit of the onboard radar apparatus.

Next, details of the correction value learning process performed by the CPU 41 will be described with reference to a flowchart in FIG. 3.

Figure 5:
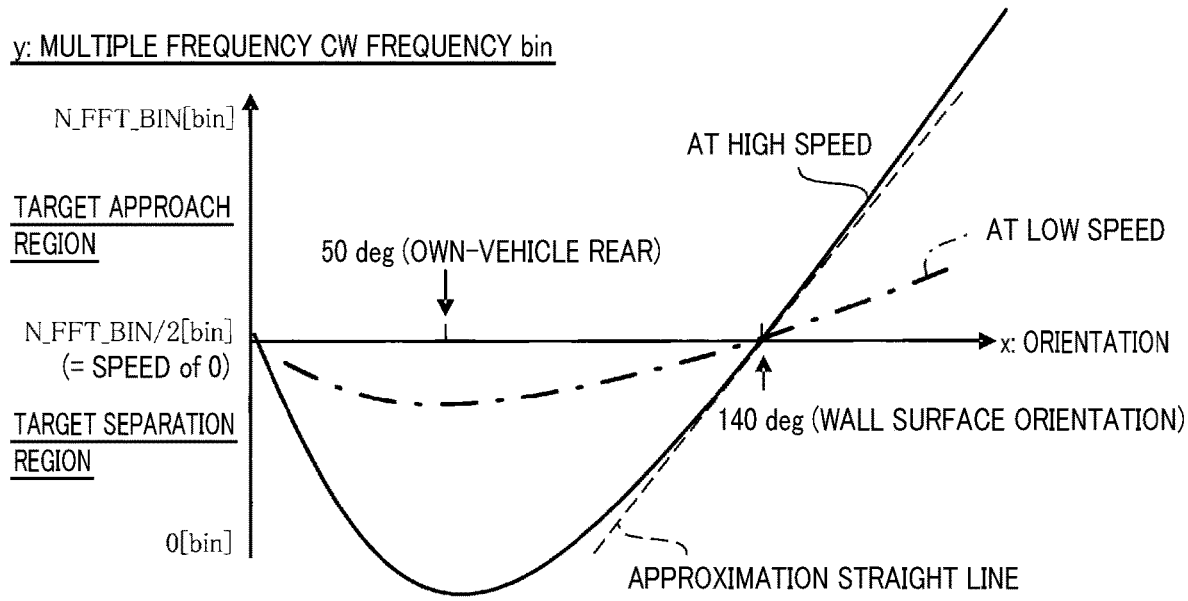
FIG. 5 is an explanatory diagram of a relationship between a theoretical curve and an approximated straight line, and changes to the theoretical curve based on an own vehicle speed, on a graph indicating a relationship between frequency bins corresponding to a relative speed between the own vehicle and an object, and an orientation of the object.

When the present process is started, at step S210, the CPU 41 acquires the own vehicle speed via the onboard LAN. The CPU 41 determines whether or not the own vehicle speed is greater than a predetermined speed threshold. The speed threshold is set to a value at which a sufficiently large slope is present in a graph (see FIG. 5) that indicates a relationship between the estimated orientation calculated at step S140 and the relative speed to the object that has reflected the radar waves. FIG. 5 is a graph that indicates a relationship between frequency bins (vertical axis: y axis) corresponding to the relative speed between the own vehicle in which the onboard radar apparatus is mounted and the object that has reflected the radar waves from the onboard radar apparatus, and the orientation (horizontal axis: x axis) of the object.

[0029]

As a result of the determination at step S210, when determined that the own vehicle speed is greater than the speed threshold (YES at step S210), the CPU 41 proceeds to step S220. Meanwhile, when determined that the own vehicle speed is equal to or less than the speed threshold (NO at step S210), the CPU 41 determines that effective learning cannot be expected and ends the present process.

Figure 6:
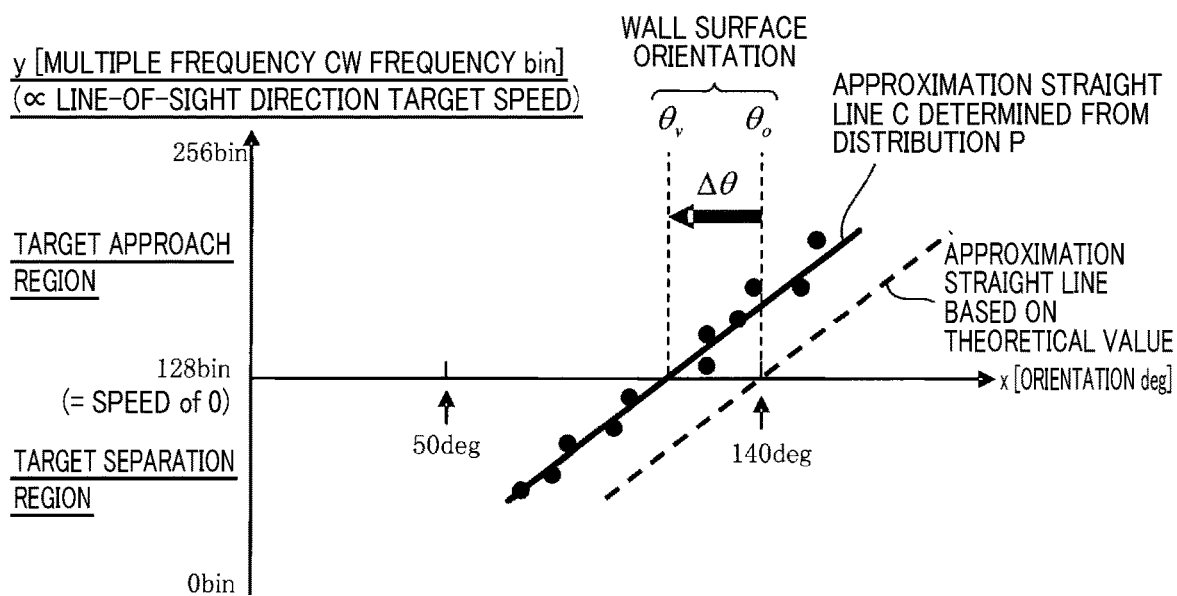
FIG. 6 is an explanatory diagram of a method for determining a mounting angle error of the onboard radar apparatus using the approximated straight line, on a graph indicating a relationship between frequency bins corresponding to a relative speed between the own vehicle and an object, and an orientation of the object.

At step S220, the CPU 41 generates a distribution P (see FIG. 6) of two-dimensional observation data composed of the relative speed between the own vehicle and the object that has reflected the radar waves and the estimated orientation of the object, based on the processing results at steps S130 and S140. In a manner similar to FIG. 5, FIG. 6 is a graph that indicates a relationship between the frequency bins (vertical axis: y axis) corresponding to the relative speed between the own vehicle in which the onboard radar apparatus is mounted and the object that has reflected the radar waves from the onboard radar apparatus, and the orientation (horizontal axis: x axis) of the object.

At step S230, the CPU 41 calculates an approximated straight line C using an expression (1). The approximated straight line C expresses a relationship between a relative speed y between the own vehicle and an object, and an orientation x of the object, which are detected for a stationary object based on observation data in which an absolute value of the relative speed is within a predetermined upper-limit value. Here, θinst is an attachment angle of the onboard radar apparatus 1; A is a constant; N_FFT_BIN is an FFT point number (such as 256); and Vself is an own vehicle speed. N_FFT_BIN/2 is set such that the relative speed to the object corresponds to zero.

[Formula 1]
$$x = \frac{A(y - \text{N\_FFT\_BIN}/2)}{V_{self}} + 180 - \theta_{inst} \quad (1)$$

At step S240, the CPU 41 calculates a minimum sum of squares W of the distribution P of the observation data used to calculate the approximated straight line C determined at step S230, relative to the approximated straight line C. The minimum sum of squares W expresses a degree of variation in the observation data. The value of the minimum sum of squares W increases as the variation increases.

At step S250, the CPU 41 determines whether or not the minimum sum of squares W determined at step S240 is less than a predetermined approximation threshold. As a result, when determined that the minimum sum of squares W (that is, the degree of approximation) is less than the approximation threshold (YES at step S250), the CPU 41 determines that the object that has reflected the radar waves is a stationary object and proceeds to step S260. Meanwhile, when determined that the degree of approximation is equal to or greater than the approximation threshold (NO at step S250), the CPU 41 determines that the object that has reflected the radar waves is not a stationary object and ends the present process.

At step S260, the CPU 41 determines a detected orientation angle θv. The detected orientation angle θv is an orientation angle at which the relative speed between the own vehicle and the object becomes zero on the approximated straight line C in the distribution P of the two-dimensional observation data composed of the relative speed between the own vehicle and the object that has reflected the radar waves, and the estimated orientation of the object, as shown in FIG. 6. Then, the CPU 41 calculates a mounting angle error Δθ (=θv−θo) of the onboard radar apparatus 1 by subtracting a theoretical orientation angle θo from the detected orientation angle θv, the theoretical orientation angle θo being an orientation angle (a direction that is at 90° relative to the longitudinal direction of the vehicle) detected from the observation data at which the relative speed between the own vehicle and the object is zero when the onboard radar apparatus 1 is attached to the own vehicle at a desired mounting angle.

At step S270, the CPU 41 calculates the orientation candidate value by performing a statistical process on the mounting angle error Δθ determined at step S260, and updates the value stored in the RAM 43. The CPU 41 then ends the present process. Specifically, determining the orientation correction value based on a moving average of the mounting angle errors Δθ determined up to a predetermined cycle prior, including the current cycle, can be considered.

[Principle]

In the calculation of the mounting angle error Δθ, advantage is taken of the fact that, when the object that has reflected the radar waves is a side stationary object such as a wall surface, a correlation is present between the relative speed of the side stationary object and the orientation at which the stationary object is present.

Figure 4:
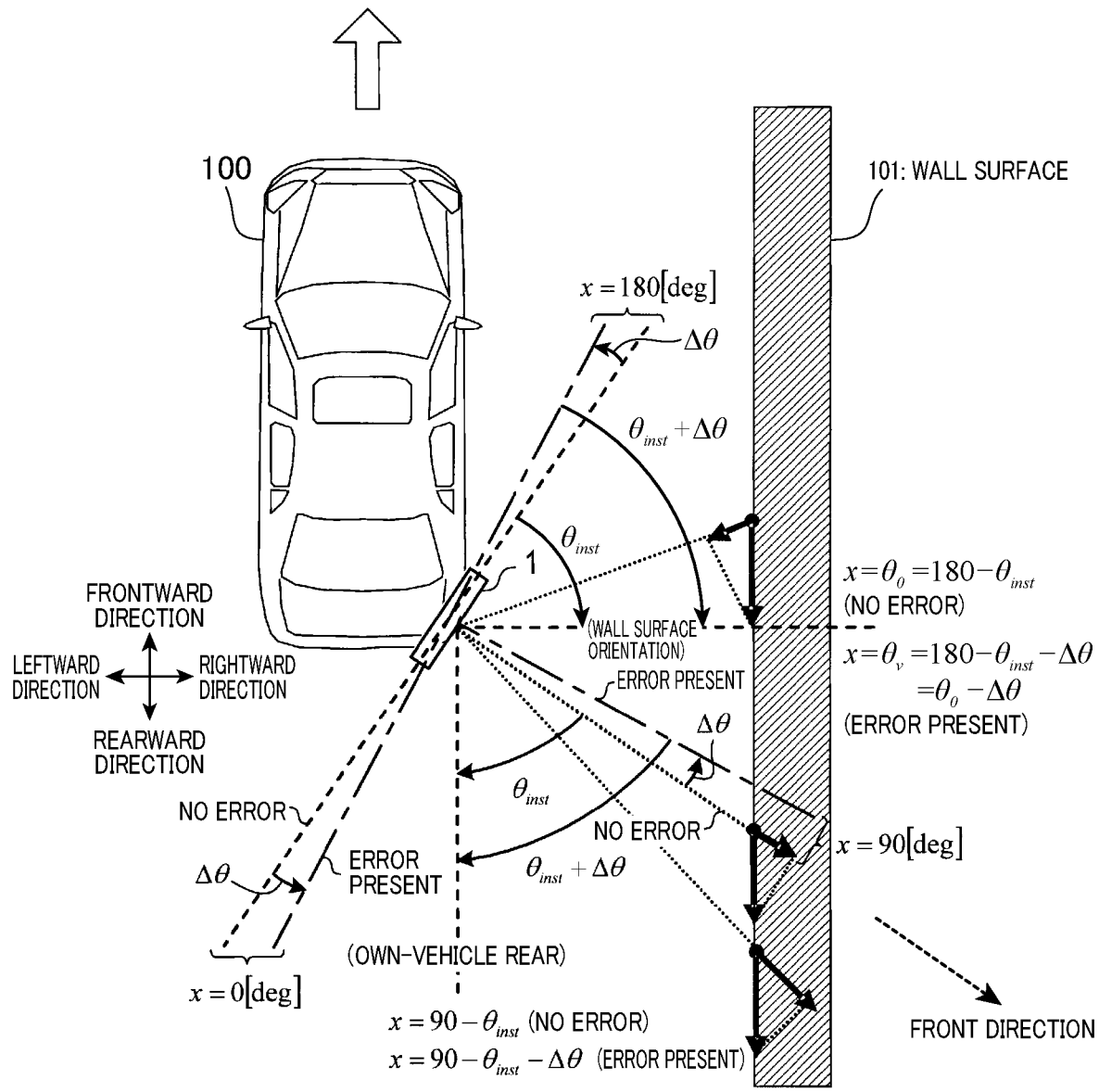
FIG. 4 is an explanatory diagram of an attachment state of the onboard radar apparatus relative to an own vehicle, and a detection method for a relative speed of a side stationary object relative to the own vehicle and an orientation thereof by the onboard radar apparatus.

That is, as shown in FIG. 4, when a stationary object such as a wall surface 101 is present to the side of a vehicle (hereafter, own vehicle) 100 on the right side, reflected waves are obtained from various locations of the wall surface 101. The orientation at which a reflection point on the wall surface 101 is present and the relative speed detected for the reflection point have the relationship shown in FIG. 5. That is, when a reflection point is present directly to the right side (a direction that is at 90° relative to the advancing direction of the vehicle 100; also referred to as a wall surface direction) of the position at which the onboard radar apparatus 1 is attached, the relative speed of the reflection point is zero. The relative speed of a reflection point positioned further towards the advancing direction side of the own vehicle 100 from the reflection point directly to the right side is a positive value that indicates approach towards the own vehicle. In addition, the relative speed of a reflection point positioned further towards the side opposite the advancing direction of the own vehicle 100 from the reflection point directly to the right side is a negative value that indicates separation from the own vehicle 100 (see FIG. 4). In both cases, the absolute value increases as the separation from the position directly to the right side increases. In addition, the graph shown in FIG. 5 has a shape that is linearly symmetrical relative to a straight line indicated by x=orientation angle of own-vehicle rear (X=50 [deg] in the example in FIG. 5).

Furthermore, as shown in FIG. 4, the onboard radar apparatus 1 is attached to the own vehicle 100 such that, with the scanning range of the onboard radar apparatus 1 being 0 to 180 [deg], the direction at 90 [deg] of the scanning range, that is, the front direction of the onboard radar apparatus 1 is tilted by the attachment angle θinst [deg] clockwise, when viewed from above the own vehicle 100, relative to the rearward direction of the own vehicle 100 (such as the own-vehicle rear in FIG. 4). Here, the orientation direction x indicates counterclockwise by being positive and clockwise by being negative.

In this case, the orientation angle x in the wall surface direction (such as the wall surface orientation in FIG. 4) of the own vehicle 100 is x=θo=180−θinst [deg] when the mounting angle error Δθ of the onboard radar apparatus 1 is not present, and x=θv=θo−Δθ=180−θinst−Δθ [deg] when the mounting angle error Δθ is present. In addition, the orientation angle x to the rear (that is, the own-vehicle rear) of the own vehicle 100 is x=90−θinst [deg] when the mounting angle error Δθ is not present, and x=90−θinst−Δθ [deg] when the mounting angle error Δθ is present.

The graph in FIG. 5 shows a case in which θinst=−40 [deg]. In this case, when the mounting angle error Δθ is not present, the orientation angle of the wall surface orientation is x=θo=140 [deg]. The orientation angle of the own-vehicle rear is x=50 [deg].

With the foregoing state as premise, in the graph shown in FIG. 5, the determined theoretical curve is indicated by a solid line (at high speed) and a single-dot chain line (at low speed) in the drawing. Regarding the theoretical curve by the solid line, the approximated straight line C determined using the expression (1) is indicated by a broken line.

As shown in FIG. 5, the changes in the theoretical curve decrease as the own vehicle speed decreases. The changes in relative speed (frequency bin) relative to direction increase as the own vehicle speed Vself increases. The frequency bins indicating the relative speed are expressed by 0 to N_FFT_BIN. The center N_FFT_BIN/2 [bin] is when the relative speed is zero. In this case, N_FFT_BIN/2 to N_FFT_BIN [bin] are a target approach region in which the stationary object is observed to be approaching the own vehicle 100. 0 to N_FFT_BIN/2 [bin] are a target separation region in which the stationary object is observed to be receding from the own vehicle 100.

In FIG. 6, a broken line is an approximated straight line (theoretical approximated straight line) relative to the theoretical curve. A solid line is the approximated straight line (observation approximated straight line) C determined from the distribution P of the actual data. That is, the difference in an orientation axis direction (x-axis direction in the drawing) between the theoretical approximated straight line and the observation approximated straight line C is the mounting angle error Δθ of the onboard radar apparatus 1.

[Effects]

As described above, in the onboard radar apparatus 1, the approximated straight line C is determined from the distribution P of the observation data indicating the relative speed to an object that has reflected the radar waves composed of continuous waves and the direction in which the object is present (arrival direction of reflected waves). The approximated straight line C indicates the relationship between the relative speed between the own vehicle and a stationary object, and the orientation at which the stationary object is present. In addition, in the onboard radar apparatus 1, the orientation angle θv and the orientation angle θo are compared, and the mounting angle error Δθ of the onboard radar apparatus 1 is thereby determined. The orientation angle θv is the orientation angle identified from the approximated straight line C and at which the relative speed between the own vehicle and the stationary object is zero. The orientation angle θo is the orientation angle at which a stationary object of which the relative speed between the own vehicle and the stationary object is zero is detected when the onboard radar apparatus 1 is set in the vehicle at a desired mounting angle. The orientation correction value is then determined by a statistical process being performed on the mounting angle error Δθ.

Therefore, in the onboard radar apparatus, observation data in which the relative speed is other than zero can also be used in the calculation of the mounting angle error Δθ (and therefore, the orientation correction value). Consequently, the number of pieces of observation data required for the calculation can be acquired in a single measurement cycle. As a result, the mounting angle error Δθ having the necessary accuracy can be obtained in a short amount of time.

In addition, in the onboard radar apparatus 1, detection error of the orientation that occurs due to shifting of the mounting angle can be suppressed and, further, detection accuracy regarding orientation can be improved. Moreover, such effects are actualized through processing of information acquired from a CW radar that is already present, without addition of a new structure. Therefore, application to apparatuses that are already present can be easily achieved.

[Other Embodiments]

An embodiment of the present disclosure is described above. However, the present invention is not limited to the above-described embodiment. Various modes are possible.

(1) According to the above-described embodiment, whether or not the distribution P is based on a stationary object is determined from the degree of variation in the distribution P relative to the approximated straight line C. However, the determination may be made using information acquired from an image from an onboard camera, map data, or the like.

(2) A function provided by a single constituent element according to the above-described embodiment may be dispersed among a plurality of constituent elements. Functions provided by a plurality of constituent elements may be integrated into a single constituent element. In addition, at least a part of a configuration according to the above-described embodiment may be replaced by a publicly known configuration providing similar functions. Furthermore, a part of a configuration according to the above-described embodiment may be omitted. Moreover, at least a part of a configuration according to an above-described embodiment may be added to or replace a configuration according to another above-described embodiment. All aspects included in the technical concept identified solely by the expressions recited in the scope of claims are embodiments of the present invention.

(3) The present invention can also be actualized by various modes in addition to the above-described mounting angle error detection method and mounting angle error detection apparatus, such as a system of an onboard radar apparatus or the like of which a constituent element is the mounting angle error detection apparatus, a program enabling a computer to function as the mounting angle error detection apparatus, and a medium on which the program is recorded.

The invention claimed is:

1. A mounting angle error detection method for detecting an error in a mounting angle of an onboard radar apparatus relative to an own vehicle, the onboard radar apparatus being set in the own vehicle such that a direction that is at 90° relative to a front-rear direction of the own vehicle is included in a scanning range and detecting at least an orientation at which an object is present using continuous waves, the mounting angle error detection method comprising:
   determining a relative speed to an object that has reflected the continuous waves by performing a frequency analysis on a signal obtained by the continuous waves being transmitted and received;
   determining an estimated orientation that is an estimated value of an orientation at which the object is positioned, for each frequency bin in which presence of the object is confirmed by the frequency analysis;
   calculating an approximated straight line that indicates a relationship between a relative speed of a stationary object relative to the own vehicle and an orientation at which the stationary object is positioned, from the relative speed determined and the estimated orientation determined;
   determining an orientation angle at which the relative speed of the stationary object relative to the own vehicle is zero, from the approximated straight line calculated; and
   determining, as a mounting angle error of the onboard radar apparatus relative to the own vehicle, a difference between the orientation angle determined and an orientation angle at which the relative speed of the stationary object relative to the own vehicle is zero based on the onboard radar apparatus being mounted in the own vehicle at a predetermined mounting angle.

2. A mounting angle error detection apparatus that detects an error in a mounting angle of an onboard radar apparatus relative to an own vehicle, the onboard radar apparatus being set in the own vehicle such that a direction that is at 90° relative to a front-rear direction of the own vehicle is included in a scanning range and detecting at least an orientation at which an object is present using continuous waves, the mounting angle error detection apparatus comprising:
   a processor, wherein the processor is adapted to:
      determine a relative speed to an object that has reflected the continuous waves by performing a frequency analysis on a signal obtained by the continuous waves being transmitted and received;
      determine an estimated orientation that is an estimated value of an arrival direction of reflected waves, for each frequency bin in which presence of the object is confirmed by the frequency analysis in the processor;
      calculate an approximated straight line that indicates a relationship between a relative speed of a stationary object relative to the own vehicle and an orientation at which the stationary object is positioned, from the relative speed determined by the processor and the estimated orientation determined by the processor; and
      determine an orientation angle at which the relative speed of the stationary object relative to the own vehicle is zero, from the approximated straight line calculated by the processor; and
      determine, as a mounting angle error of the onboard radar apparatus relative to the own vehicle, a difference between the orientation angle determined by the processor and an orientation angle at which the relative speed of the stationary object relative to the own vehicle is zero based on the onboard radar apparatus being mounted in the own vehicle at a predetermined mounting angle.

3. The mounting angle error detection apparatus according to claim 2, wherein:
   the onboard radar apparatus uses multiple frequency continuous wave as the continuous waves; and
   the processor performs processing using an average value of frequency analysis results performed for each frequency of the continuous waves.

4. The mounting angle error detection apparatus according to claim 3, wherein:
   the processor calculates the approximated straight line using, among calculation results of the relative speed calculated by the processor and the orientation estimated by the processor, calculation results of which an absolute value of the relative speed is within a predetermined upper-limit value.

5. The mounting angle error detection apparatus according to claim 4, wherein:
   the processor calculates the mounting angle error in response to a degree of variation in a distribution used for calculation of the approximated straight line relative to the approximated straight line being less than a predetermined approximation threshold.

6. An onboard radar apparatus that is set in an own vehicle such that a direction that is at 90° relative to a front-rear direction of the own vehicle is included in a scanning range and detects at least an orientation at which an object is present using continuous waves, the onboard radar apparatus comprising:
   a processor, wherein the processor is adapted to:
      detect an error in a mounting angle of the onboard radar apparatus relative to the own vehicle;
      determine a relative speed to an object that has reflected the continuous waves by performing a frequency analysis on a signal obtained by the continuous waves being transmitted and received;
      determine an estimated orientation that is an estimated value of an arrival direction of reflected waves, for each frequency bin in which presence of the object is confirmed by the frequency analysis in the processor;
      calculate an approximated straight line that indicates a relationship between a relative speed of a stationary object relative to the own vehicle and an orientation at which the stationary object is positioned, from the relative speed determined by the processor and the estimated orientation determined by the processor;

determine an orientation angle at which the relative speed of the stationary object relative to the own vehicle is zero, from the approximated straight line calculated by the processor;

determine, as a mounting angle error of the onboard radar apparatus relative to the own vehicle, a difference between the orientation angle determined by the processor and an orientation angle at which the relative speed of the stationary object relative to the own vehicle is zero based on the onboard radar apparatus being set in the own vehicle at a predetermined mounting angle;

calculate an orientation correction value by performing a statistical process on the mounting angle error determined by the processor; and correct the estimated orientation determined by the processor using the orientation correction value calculated by the processor.

7. The onboard radar apparatus according to claim 6, wherein:

the onboard radar apparatus uses multiple frequency continuous wave as the continuous waves; and the processor performs processing using an average value of frequency analysis results performed for each frequency of the continuous waves.

8. The onboard radar apparatus according to claim 7, wherein:

the processor calculates the approximated straight line using, among calculation results of the relative speed calculated by the processor and the orientation estimated by the processor, calculation results of which an absolute value of the relative speed is within a predetermined upper-limit value.

9. The onboard radar apparatus according to claim 8, wherein:

the processor calculates the mounting angle error in response to a degree of variation in a distribution used for calculation of the approximated straight line relative to the approximated straight line being less than a predetermined approximation threshold.

10. The mounting angle error detection apparatus according to claim 2, wherein:

the processor calculates the approximated straight line using, among calculation results of the relative speed calculated by the processor and the orientation estimated by the processor, calculation results of which an absolute value of the relative speed is within a predetermined upper-limit value.

11. The mounting angle error detection apparatus according to claim 2, wherein:

the processor calculates the mounting angle error in response to a degree of variation in a distribution used for calculation of the approximated straight line relative to the approximated straight line being less than a predetermined approximation threshold.

12. The mounting angle error detection apparatus according to claim 3, wherein:

the processor calculates the mounting angle error in response to a degree of variation in a distribution used for calculation of the approximated straight line relative to the approximated straight line being less than a predetermined approximation threshold.

13. The onboard radar apparatus according to claim 6, wherein:

the processor calculates the approximated straight line using, among calculation results of the relative speed calculated by the processor and the orientation estimated by the processor, calculation results of which an absolute value of the relative speed is within a predetermined upper-limit value.

14. The onboard radar apparatus according to claim 6, wherein:

the processor calculates the mounting angle error in response to a degree of variation in a distribution used for calculation of the approximated straight line relative to the approximated straight line being less than a predetermined approximation threshold.

15. The onboard radar apparatus according to claim 7, wherein:

the processor calculates the mounting angle error in response to a degree of variation in a distribution used for calculation of the approximated straight line relative to the approximated straight line being less than a predetermined approximation threshold.

* * * * *